(12) United States Patent
Eckhardt et al.

(10) Patent No.: US 8,249,741 B2
(45) Date of Patent: Aug. 21, 2012

(54) CONTROL OF MACHINE TOOLS COMPRISING A TOOL MAGAZINE AND AN INTERMEDIATE STORAGE STATION

(75) Inventors: Marco Eckhardt, Velbert (DE); Robert Speich, Paderborn (DE)

(73) Assignee: Toyoda Mitsuiseiki Europe GmbH, Krefeld-Oppum (DE)

( * ) Notice: Subject to any disclaimer, the term of this patent is extended or adjusted under 35 U.S.C. 154(b) by 189 days.

(21) Appl. No.: 12/450,658

(22) PCT Filed: Mar. 28, 2008

(86) PCT No.: PCT/DE2008/000521
§ 371 (c)(1),
(2), (4) Date: Oct. 5, 2009

(87) PCT Pub. No.: WO2008/122263
PCT Pub. Date: Oct. 16, 2008

(65) Prior Publication Data
US 2010/0145497 A1  Jun. 10, 2010

(30) Foreign Application Priority Data
Apr. 4, 2007 (DE) .......................... 10 2007 016 234

(51) Int. Cl.
*G06F 19/00* (2011.01)
*B23Q 3/155* (2006.01)

(52) U.S. Cl. .................... 700/179; 700/3; 700/9; 483/1; 483/15; 483/63

(58) Field of Classification Search .................. 700/3, 9, 700/10, 20, 82, 96, 179; 483/1, 4, 14, 15, 483/22–26, 40, 41, 63
See application file for complete search history.

(56) References Cited

U.S. PATENT DOCUMENTS

| | | | | |
|---|---|---|---|---|
| 5,378,218 A | * | 1/1995 | Daimaru et al. | 483/9 |
| 2003/0182014 A1 | * | 9/2003 | McDonnell et al. | 700/159 |
| 2005/0209725 A1 | * | 9/2005 | Akiyama et al. | 700/112 |

FOREIGN PATENT DOCUMENTS

| | | |
|---|---|---|
| DE | 601 04 476 | 8/2005 |
| DE | 698 28 947 | 1/2006 |
| EP | 0 553 621 | 8/1993 |
| EP | 0 645 721 | 3/1995 |
| EP | 1 153 705 | 11/2001 |
| WO | WO 2006/050551 | 5/2006 |

* cited by examiner

*Primary Examiner* — Sean Shechtman
(74) *Attorney, Agent, or Firm* — D. Peter Hochberg; Sean F. Mellino; Daniel J. Smola

(57) ABSTRACT

A method for controlling the loading and unloading of machine tools where the tools from a magazine are first taken over into an intermediate storage station or provision area and from there are supplied to the machine tool. The tools are inserted into the machine tool using a changing apparatus for transfer to the machine tool. The magazine and the machine tool are each provided with a CNC controller and a PLC controller, and these components are adjusted by a separate controller. The magazine and the machine tool can each be provided with a separate CNC controller and PLC controller or a common CNC controller and PLC controller. Multichannel controllers, preferably dual-channel controllers, can also be used.

10 Claims, 3 Drawing Sheets

CONTROL OF MACHINE TOOLS COMPRISING A TOOL MAGAZINE AND AN INTERMEDIATE STORAGE STATION

This application is a National Stage application of International Application No. PCT/DE2008/000521, filed on Mar. 28, 2008, which claims priority of German Application Serial No. 10 2007 016 234.2 filed on Apr. 4, 2007.

BACKGROUND OF THE INVENTION

1. Field of the Invention

The invention relates to the control of machine tools by adjusting the CNC controllers and the PLC controller in the tool magazine and the machine tool by means of a separate controller.

2. Description of the Prior Art

The operation of machining complex workpieces requires a large number of different machining tools since each tool undertakes special subtasks for completing the workpiece. For this purpose, machining centers have an integrated tool magazine.

Under electronic control, a specific tool is selected for the respective machining step and the spindle of the machine tool is changed. The next machining step can now be carried out using this tool. This operation is repeated until the workpiece is completed.

During each tool change, the machining operation is interrupted until the change has been completely concluded. The change time varies very greatly depending on the type of magazine (chain, matrix), the access methods used (organized or chaotic method) and the number of tool places. A realistic value for a tool change including the provision time is between 30 and 120 seconds for each tool change.

These waiting times for the next tool are generally shortened by coding commands, which instruct a magazine transporting unit to already provide the follow-on tool, inside a computerized numerical controller (CNC controller). With the next change command, only the tool between the spindle and the transporting unit is thus changed. This is considerably faster since the transporting times are dispensed with.

However, the advantage of this optimization fails entirely in the case of short tool paths and short tool machining sequences, that is to say if the machining times of the tool are shorter than the provision times of the magazine used.

In order to minimize these waiting times, it is advantageous to temporarily store (intermediate storage station) and/or provide any desired number of follow-on tools as close to the spindle as possible during long tool machining times.

This manner of loading and unloading tools in machine tools is described, for example, in WO 2006/050551 A2. According to this method, the tools from a magazine are first of all taken over into an intermediate storage station, the tools being simultaneously removed from the intermediate storage station and the machine tool or inserted therein using a changing apparatus during transfer to the machine tool. This method has the disadvantage of delays arising as a result of uncoordinated processes and thus a rise in the cost of the operation of machining the tool.

EP 0 645 721 A1 relates to the control and organization of different multimedia presentations in which overlapping of the presentations is avoided.

The individual presentations are stored in individual memories and are combined in a playback device. The memory playback device is controlled by a central computer (FIG. 1).

DE 601 04 476 T2 describes a tool changing device in which a changing arm can be rotated by the engagement of a cam and a cam follower. As illustrated in FIG. 5 of this reference, the numerical controller has a computerized numerical controller (CNC), a programmable logic controller (PLC) and an input/output interface.

EP 0 553 621 A1 describes a programmable computer controller for machine tools. In a first adaptive control module between the CNC controller and the workpiece to be machined and an adaptive controller for controlling the machine function, control commands are transmitted from the CNC part to the first adaptive control module via an interface between the CNC part and the first adaptive control module, the control commands from the CNC part being able to be influenced using a data input device.

DE 698 28 947 T2 describes a flexible production system with the completion of a machine tool. Individual workpiece transfer units for machining on the spindle heads of the machine tool are indexed using a control unit 50.

SUMMARY OF THE INVENTION

The object of the present invention is the control of machine tools comprising tools for machining workpieces, in which the processes are coordinated in such a manner that only minor waiting times occur in practice.

A method for controlling the loading and unloading of machine tools has been found, in which the tools from a magazine are first of all taken over into an intermediate storage station or provision area and from there are supplied to the machine tool, the tools being removed from the intermediate storage station/provision area and the machine tool or inserted therein, using a changing apparatus during transfer to the machine tool, characterized in that the magazine and the machine tool are each provided with a CNC controller and a PLC controller, and these components are adjusted by means of a separate controller.

Within the scope of the present invention, the magazine and the machine tool can each be provided with a separate CNC controller and PLC controller or a common CNC controller and PLC controller. Multichannel controllers, preferably dual-channel controllers, can preferably be used.

BRIEF DESCRIPTION OF THE DRAWINGS

Hereinafter, the invention is described in more detail by means of the drawings wherein.

DETAILED DESCRIPTION OF THE PREFERRED EMBODIMENT

Figure 1:
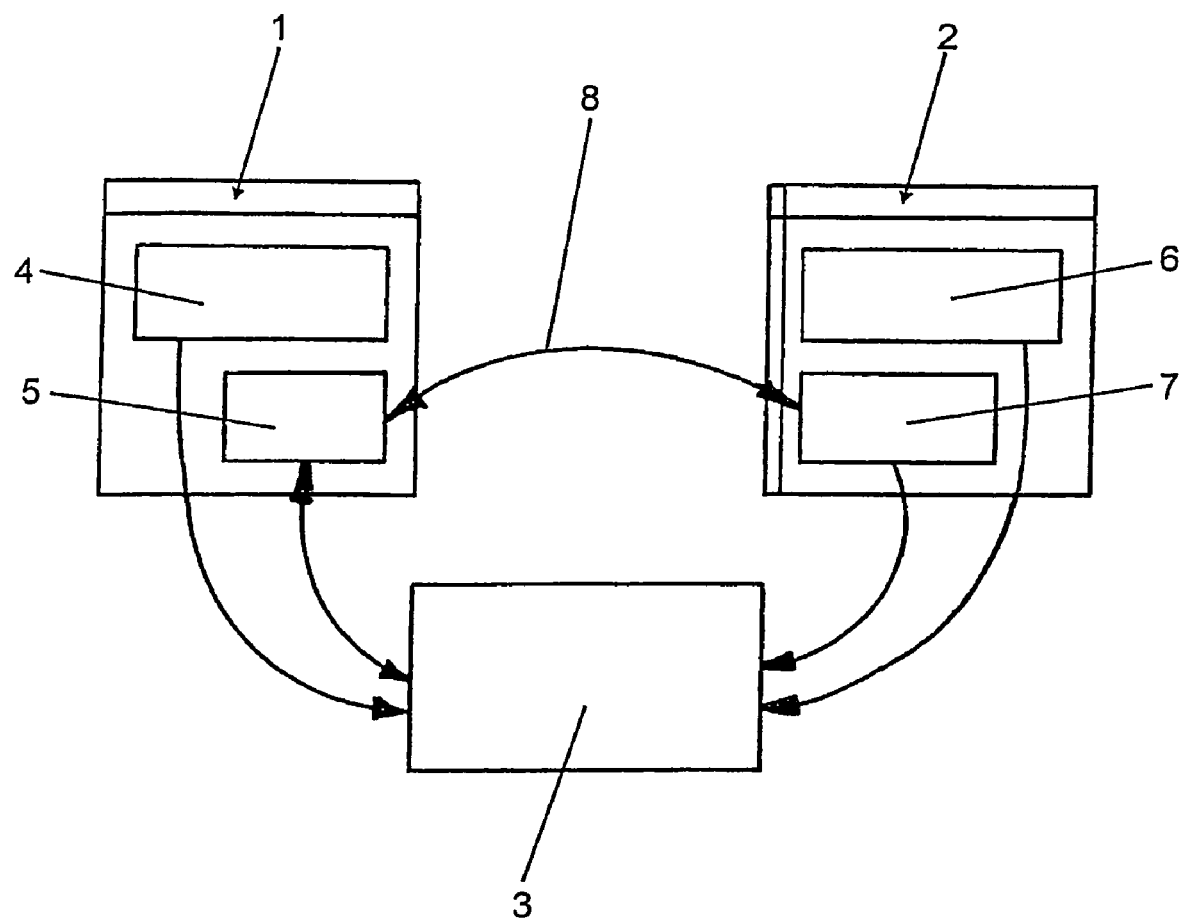
FIG. 1 is a diagrammatic illustration of the manner in which the individual components are linked according to the present invention.

The manner in which the individual components are linked according to the present invention is explained by means of the diagrammatic illustration in FIG. 1.

The magazine 1 and the machine tool with a spindle 2 are each provided with a respective CNC controller 4, 5 and a respective PLC controller 6, 7. This may also be a controller with different channels. The electronic components are adjusted using the separate controller 3. This controller is a software application. It may likewise also be integrated in the CNC controller 4, 5 (depending on the operating system). The electronic controller 3 thus receives signals (information) relating to the current status of the magazine 1 which is organized by its CNC controller 4. In the same manner, the controller 3 contains signals (information) relating to the current status of the spindle in the machine tool 2, the need for which is determined by the PLC controller 7. On the basis of this information, the electronic controller 3 uses the PLC controllers 6 and 7 to control the removal of a tool from, and the return of a tool to, the magazine 1 and the loading and unloading of the spindle using transporting units which are known per se, the intermediate storage station and the changing apparatus.

With the aid of the method according to the invention, the amount of time lost when changing a tool in the spindle 2 is practically reduced to the amount of time needed to remove and insert the tool since no time is lost as a result of the tool being transported from the magazine 1 to the spindle 2. The amount of time gained makes it possible to produce the desired workpieces in a cost-effective manner.

The programmable logic controller (PLC) which is known per se is an electronic subassembly which is used for control and regulation tasks in automation technology.

PLC technology has a processor architecture which is essentially optimized for bit, byte or word linking. Particular attention needs to be paid to the different addressing when different controllers are linked to one another via a field bus, for example Profibus. Under certain circumstances, bytes inside the program must then be interchanged in pairs in order to depict the correct information. The bit, byte or word processing is adapted to the machine or system to be controlled by means of a program which determines the desired sequence and is stored in the memory.

The PLC controller is usually also provided with software for communication between the programming device and the controller. Programming is effected using this programming device, for example an application under Windows/Linux on a PC or a tailor-made system. The so-called configuration provided here is loaded onto the controller during programming. It remains there in the memory until it is erased or overwritten by the user.

Within the scope of the present invention, the term CNC technology (Computerized Numerical Control) is understood as meaning the electronic control of machine tools.

The computerized numerical controller (CNC) which is known per se is an electronic device for controlling machine tools.

From the CNC program, the support points are interpolated in a short period of time in the machine tool. These support points are used as a reference variable for the individual axes while heeding maximum speeds. It is thus taken into account that the machine can follow the predefined accelerations only within particular limits and the temporal changes in the accelerations also need to be limited.

A CNC machine tool is controlled using a computer which is directly integrated in the controller, detects the "actual state" using position, (angle of) rotation and state sensors and accordingly controls the motors and other controlled machine elements after the interpolation to the "desired state" has been calculated from the CNC program. In this case, the interpolation is effected in the millisecond range, with the result that a high level of precision is also ensured at high speed even in the case of complicated shapes.

According to the present invention, a separate controller 3 is used to adjust the CNC controller 4, 5 and the PLC controller 6, 7 in the magazine and in the machine tool.

Control is characterized by reading all tools used from the instantaneous machining program of the machine tool. The operation of putting these tools in a desired order depending on the instantaneous machining status and making them available to the intermediate storage station/provision area and the decision regarding which tools from the intermediate storage station/provision area are returned to the magazine region again can preferably take place as follows:

When the machining program in the machine tool is started, the CNC program structure is first initialized. Existing CNC data are erased in the structure.

The CNC main program and all included subprograms are then determined and are read from the CNC controller. These CNC data are internally stored in a structure for subsequent use.

In order to assess the situation further, the program pointer in the CNC program running in the machine tool is determined. For this purpose, a CNC program must be determined and the current CNC program must be identified. Different methods are available:

The CNC controller has a direct function for determining the position in the CNC program which is running.

The CNC controller does not have a function which can be used; in this case, this functionality must be simulated using available means.

If the program pointer has been determined, the CNC structure can be searched for follow-on tools. In this case, a search is carried out from the current position in all subprograms used for the machining operation. All tools found are logged in a "follow-on list".

In a dynamically running process, all tools are not always in their place in the magazine store since they may likewise be in the transporting system or in the spindle.

These tools and their positions in the system must be determined. The results are logged in a "status list".

In the case of an empty changing store, the position at which a follow-on tool is stored in the changing store is not important. If there are already tools in the changing store, a decision must be made regarding which tools must remain in the changing store and which tools must be replaced in the changing store.

The "status list" and the "follow-on list" form the basis for this assessment. The contents of the two lists have already been updated with current data in the previous step.

Within the scope of the present invention, the separate electronic controller is used to determine the priorities for changing the tools in the spindle. The positions in the changing store are important for the assessment with priorities.

The priorities of the status list are then assessed and overwritten. All tool places in the changing store may be fitted with tools or changed since they are not important for the immediate machining operation. All other tools are soon inserted into the spindle. Furthermore, the maximum number of reload changing operations can be determined by counting the number of positions in the magazine. The method is simple and can be used for changing stores with any desired number of places. According to this method, an algorithm can be implemented in a simple manner in any computer language.

If the number of possible reloading tools is known, the reloading list is generated. In this case, a check is carried out, beginning with the first element in the follow-on list, in order to determine whether the element in the status list is already available. If not yet available, the element is copied to the reloading list. Otherwise, the investigation is repeated with the next element in the follow-on list until the end of the follow-on list has been reached or the reloading list comprises a maximum number of elements.

If the transporting unit is ready for further transport operations, the reloading list is processed. In this case, the first element in the reloading list is removed and a transport instruction is generated. After successful transport feedback, the element is erased from the list. As a result, all other elements move up. This operation is repeated until the reloading list is empty or further PLC events are detected.

PLC events may be, for example, the completion of a tool change, a CNC stop or a fault message.

If the program is ended (event: program stop), internal tidying work must be carried out in the machine tool. In this case, the contents of all lists which are no longer relevant at this point in time are erased, inter alia.

Figure 2:
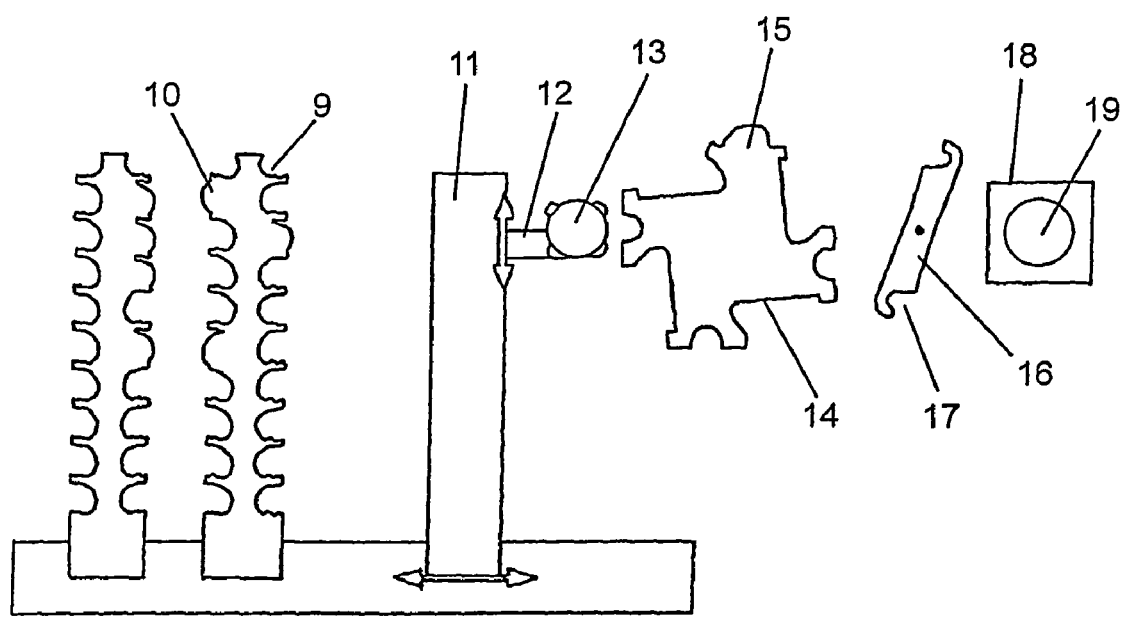
FIG. 2 shows the arrangement for loading and unloading a machine tool using a four-armed intermediate storage station.

The arrangement for loading and unloading a machine tool is intended to be explained using the example of a four-armed intermediate storage station (FIG. 2).

The individual tools 10 are situated in the individual storage places in the matrix magazine 9 provided by CNC control and PLC control. The tools are moved from the magazine 9 to the intermediate storage station 14 with the aid of the movable transporting unit 11 with the movable gripper 12. The possible movements of the transporting unit 12 are indicated using arrows.

The tools 15 are stored in the four-armed intermediate storage station 14.

The tools 17 are removed from the intermediate storage station 14 using the changing apparatus 16 and are inserted into the spindle 18 at the place 19.

Figure 3:
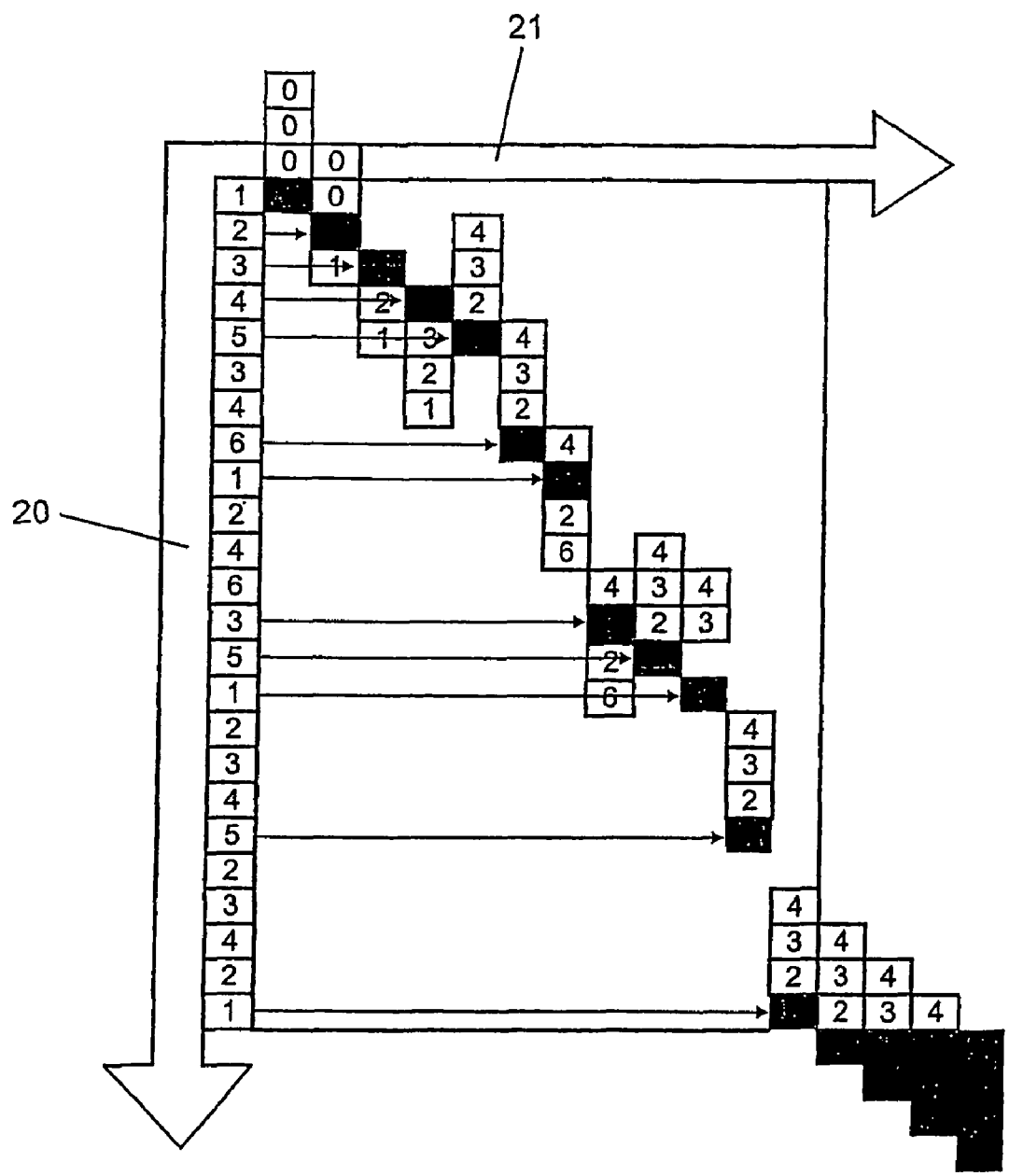
FIG. 3 shows the individual states of the tool change operation and the changing sequence in the CNC code.

Within the scope of the present invention, the desired tool changing sequence when using a four-armed intermediate storage station shall be explained by means of FIG. 3.

In FIG. 3, the individual states of the tool change operation are shown on the abscissa 21 and the changing sequence in the CNC code are shown on the ordinate 20. Each field in the diagram symbolizes a place in the intermediate storage station.

The transport journeys of the transporting unit from the magazine to the changing store which have been saved when the subsequent tool is provided fully are seen in the diagram. The CNC program requires 24 tool changes, but only 12 of them are actually transported as a result of buffering in the intermediate storage station.

Having described the invention, it will be apparent to those skilled in the art that alterations and modifications may be made without departing from the spirit and scope of the invention limited only by the appended claims.

The invention claimed is:

1. A method for controlling the loading and unloading of tools from a machine tool, said method comprising the steps of:
   transferring the tools from or to a magazine respectively to or from an intermediate storage station or provision area;
   transferring the tools from or to the intermediate storage station/provision area respectively to or from a spindle of the machine tool using a changing apparatus;
   providing a first CNC controller and a first PLC controller to the magazine for controlling the magazine;
   providing a second CNC controller and a second PLC controller to the machine tool for controlling the machine tool;
   using a separate controller for adjusting each of the first CNC controller and the first PLC controller for controlling the removal and the return of a tool from or to the magazine and for adjusting each of the second CNC controller and the second PLC controller for controlling the uploading and unloading of the spindle of the machine tool; and
   appointing priorities to the tools by said separate controller adjusting the second CNC controller and the second PLC controller to exchange the tools into the spindle of the machine tool.

2. The method as claimed in claim 1, wherein said machine tool includes a machine program and said second CNC controller includes a CNC main program and optional sub-programs, and said method further comprising the sequential steps of starting the machine program, and ascertaining and reading out the CNC main program and any sub-programs of the second CNC controller after the machining program has been started.

3. The method as claimed in claim 1 wherein the respective CNC controllers each have a main program, optional sub-programs and structure, and further comprising the step of filing the respective CNC main programs and any sub-programs for a later internal use in a respective CNC structure.

4. The method as claimed in claim 3 further comprising the step of browsing the respective CNC structures from the respective actual positions in the used sub-programs required for working for follow-on tools; and
   saving the follow-on tools in a list of compounds.

5. The method as claimed in claim 2, wherein the second CNC main program includes a program pointer, said method further comprising the step of ascertaining the program pointer while the second CNC main program of the machine tool is running.

6. The method as claimed in claim 4, further comprising the steps of:
   providing a movable transporting unit for supplying the tools from the magazine to the intermediate storage station or to the spindle; and
   registering the positions of the tools located in movable transporting unit in a status list.

7. The method as claimed in claim 6 further comprising the step of generating a reload list from the list of compounds and the status list.

8. The method as claimed in claim 3, wherein the respective CNC main programs include a program pointer, said method further comprising the step of ascertaining the program pointer while the second CNC main program of the machine tool is running.

9. The method as claimed in claim 4, wherein the respective CNC main program includes a program pointer, said method further comprising the step of ascertaining the program pointer while the second CNC main program of the machine tool is running.

10. A method for controlling the loading and unloading of tools from a machine tool, respectively from or to a magazine, the magazine being provided with a first CNC controller and a first PLC controller and the machine tool being provided with a second CNC controller and a second PLC controller, the respective CNC controllers and PLC controllers being adjusted by a separate controller, said method comprising the steps of:
   transferring the tools from or to a magazine respectively to or from an intermediate storage station or provision area;
   transferring the tools from or to the intermediate storage station/provision area respectively to or from a spindle of the machine tool using a changing apparatus; and
   appointing priorities to the tools by the separate controller to exchange the tools into the spindle of the machine tool.

* * * * *